(12) United States Patent
Chirol et al.

(10) Patent No.: US 10,688,532 B2
(45) Date of Patent: Jun. 23, 2020

(54) INSTALLATION FOR IDENTIFYING HANDLED PARCELS

(71) Applicant: SOLYSTIC, Bagneux (FR)

(72) Inventors: Luc Chirol, Paris (FR); Emmanuel Miette, Saint Gratien (FR)

(73) Assignee: SOLYSTIC (FR)

( * ) Notice: Subject to any disclaimer, the term of this patent is extended or adjusted under 35 U.S.C. 154(b) by 52 days.

(21) Appl. No.: 14/897,209

(22) PCT Filed: Sep. 15, 2015

(86) PCT No.: PCT/FR2015/052465
§ 371 (c)(1),
(2) Date: Feb. 14, 2018

(87) PCT Pub. No.: WO2016/059313
PCT Pub. Date: Apr. 21, 2016

(65) Prior Publication Data
US 2019/0022703 A1    Jan. 24, 2019

(30) Foreign Application Priority Data
Oct. 13, 2014  (FR) ..................................... 14 59805

(51) Int. Cl.
*G06K 19/00*  (2006.01)
*B07C 3/12*  (2006.01)
(Continued)

(52) U.S. Cl.
CPC ............ *B07C 3/12* (2013.01); *G06K 7/10386* (2013.01); *G06K 7/10722* (2013.01);
(Continued)

(58) Field of Classification Search
USPC .................................. 235/435, 439, 454, 462
See application file for complete search history.

(56) References Cited

U.S. PATENT DOCUMENTS

| | | |
|---|---|---|
| 2002/0008621 A1 | 1/2002 | Barritz |
| 2006/0192013 A1 | 8/2006 | Odenthal |
| | (Continued) | |

FOREIGN PATENT DOCUMENTS

| | | |
|---|---|---|
| JP | H11120240 A | 4/1999 |
| JP | H11154772 A | 6/1999 |
| | (Continued) | |

OTHER PUBLICATIONS

Japanese Office Action dated Jun. 19, 2018, for Japanese Patent Application No. 2017-538461.
(Continued)

*Primary Examiner* — Matthew Mikels
(74) *Attorney, Agent, or Firm* — Ware, Fressola, Maguire & Barber LLP

(57) ABSTRACT

An installation for identifying handled parcels, said installation including a linear conveyor for conveying parcels in series. The installation further includes a monitoring and control central unit suitable for instantly determining the three-dimensional position of each parcel on the conveyor, and at least one handheld electronic unit that is suitable for detecting identification information on a parcel when it is placed in the vicinity of said parcel, and for transmitting said information to the central unit. The central unit is arranged to read an instantaneous three-dimensional position for said handheld unit in response to receiving said information coming from said handheld unit, and to detect a match between said instantaneous three-dimensional position of the handheld unit and said instantaneous three-dimensional position of the parcel as determined by the central unit.

6 Claims, 1 Drawing Sheet

(51) Int. Cl.
*G06Q 10/08* (2012.01)
*G06K 7/10* (2006.01)
*G06K 7/14* (2006.01)

(52) U.S. Cl.
CPC ......... *G06K 7/1413* (2013.01); *G06Q 10/087* (2013.01); *B07C 2301/0008* (2013.01)

(56) References Cited

U.S. PATENT DOCUMENTS

2007/0124077 A1    5/2007    Hedlund
2013/0223673 A1*  8/2013    Davis ...................... G06K 9/78
                                                      382/100

FOREIGN PATENT DOCUMENTS

| JP | 2001104892 A | 4/2001 |
| JP | 2003225619 A | 8/2003 |
| WO | 2011109655 A1 | 9/2011 |
| WO | 2014057182 A1 | 4/2014 |

OTHER PUBLICATIONS

French Search Report dated Jun. 16, 2015, for Application No. 1459805.

* cited by examiner

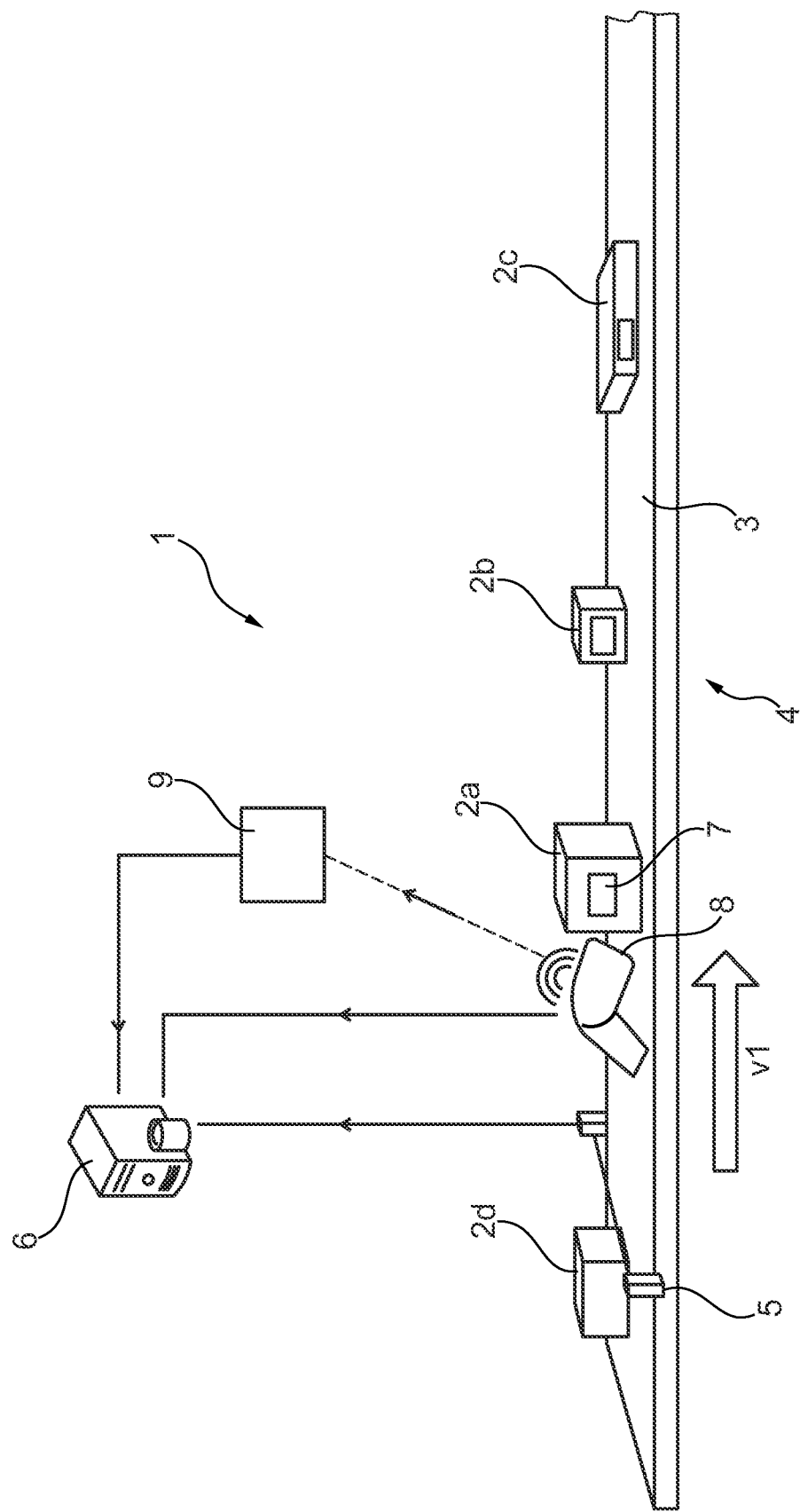

INSTALLATION FOR IDENTIFYING HANDLED PARCELS

TECHNICAL FIELD

The invention relates to the field of handling parcels, in particular postal parcels.

The invention relates more particularly to an installation for conveying handled parcels, said installation including a linear conveyor for conveying parcels in series, and a monitoring and control central unit that stores, in a memory, the instantaneous three-dimensional position of each parcel moving on the conveyor.

PRIOR ART

Such an installation is widely used in logistics centers for sorting postal parcels. Generally, the parcels are unloaded from a truck and are placed one-by-one in series on a linear conveyor by an operator, and they are conveyed towards sorting outlets of the linear conveyor so as then to be delivered in the order of a delivery round or "postman's walk".

Passage sensors are disposed along the conveyor and are connected to the central unit so that, on the basis of computation of the instantaneous three-dimensional position of each parcel, said central unit can direct said parcel to the sorting outlet that corresponds to the delivery address on the parcel.

Conventionally, the delivery address on each parcel is read by a camera mounted on a gantry or gate at the inlet of the linear conveyor. Unfortunately, that requires the operator to position each parcel correctly with its destination postal address facing upwards. In addition, inputting information at the inlet of the conveyor suffers from the drawback of reducing the flexibility of the organization of the installation.

SUMMARY OF THE INVENTION

An object of the invention is to remedy those drawbacks.

The basic idea of the invention is for the information on a parcel moving on the conveyor to be input on the fly by means of a handheld electronic unit that can be located in three-dimensional space by the central unit. This information may be unique parcel identification information such as a bar code or else a delivery address for the parcel, or indeed any other information usually placed on a postal parcel or the like.

More particularly, the invention provides an installation for conveying handled parcels, said installation including a linear conveyor for conveying parcels in series, and a monitoring and control central unit that stores, in a memory, the instantaneous three-dimensional position of each parcel moving on the conveyor, said installation being characterized in that it further includes at least one handheld electronic unit that is suitable for detecting information on a parcel when it is placed in the vicinity of said parcel, and for transmitting said information to the central unit, and in that the central unit is arranged to read an instantaneous three-dimensional position for said handheld unit in response to receiving said information coming from said handheld unit, and in that said central unit is further arranged to detect a match between the instantaneous three-dimensional position of a certain parcel on the conveyor and said instantaneous three-dimensional position of the handheld unit, and to respond to such a match being detected by recording said information in a memory in correspondence with data associated with said certain parcel.

The operator thus moves around the logistics platform of the installation while holding the nomadic handheld unit in the hand, it then being easy for the operator to point said handheld unit towards the information to be input that is on a parcel moving on the conveyor.

Since this input of information is not input at a fixed workstation, it does not put any constraints on the way the logistics installation is organized, and it is also possible to make provision to have a plurality of handheld units in the installation at the same time for parcels passing through the inlet of the linear conveyor at a high rate.

The installation of the invention may advantageously have the following features:

said handheld unit may be a bar code reader;
said handheld unit may be a digital camera;
said handheld unit may be equipped with a geotag;
the parcels are postal parcels.

The invention also provides a postal parcel sorting facility including a logistics installation as defined above.

BRIEF DESCRIPTION OF THE DRAWING

The present invention can be better understood and other advantages appear more clearly on reading the following detailed description illustrated by the accompanying drawing, in which:

FIG. 1 is a very diagrammatic view of an installation having a conveyor for transporting postal parcels, and a handheld unit in the vicinity of a parcel for the purpose of inputting its identification information on the fly.

DESCRIPTION OF AN EMBODIMENT

FIG. 1 is a fragmentary view of a logistics installation 1 for conveying handled parcels such as 2a, 2b, 2c, and 2d, by means of a linear conveyor 3 that is adapted for transporting the parcels in series, e.g. towards sorting outlets that are not shown in FIG. 1. It should be understood that the invention also relates to a postal parcel sorting facility including the logistics installation 1.

The conveyor 3 is provided with a conveying section 4 along which an operator can approach the parcels moving on the conveyor 3.

The arrow V1 indicates the speed of movement of the parcels on the conveyor. The speed V1 may be relatively constant.

A passage sensor 5 is also shown, upstream from the conveying section 4. The sensor 5 may be a photoelectric detection cell.

FIG. 1 also shows a monitoring and control central unit 6 that is suitable for storing, in a memory, the instantaneous three-dimensional position of each parcel on the conveyor from the instant at which the parcel in question goes past a passage sensor such as the passage sensor 5.

Data representative of the instantaneous three-dimensional position of the parcel such as 2a may, for example, be computed by the central unit 6 on the basis of the speed V1 and of the time that has elapsed since the instant T at which the parcel 2a went past the passage sensor 5.

In accordance with the invention, the installation 1 also includes a handheld electronic unit 8 that is suitable for detecting identification information 7 on a parcel when it is placed in the vicinity of said parcel, e.g., in this example, a few centimeters (cm) from the parcel, and for transmitting said information 7 to the central unit 6, which, in response, is adapted for reading the instantaneous three-dimensional position of the handheld unit 8 and for searching for a match between the instantaneous three-dimensional position of the handheld unit as read substantially at the time at which the information is input and the instantaneous three-dimensional position of a certain parcel on the conveyor (the parcel for which the information on it has been input).

If a match is found by the central unit 6, said central unit can record the input information in a memory in correspondence with data associated with said parcel and stored in the memory.

Said information may be a unique parcel identification code or else, for example, an image of the parcel including delivery address information.

The handheld unit 8 may be a bar code reader or, for example, a digital camera if the information 7 is an image.

The handheld unit 8 is preferably a handheld unit that communicates remotely and in wireless manner with the monitoring central unit 6. It is possible to have a plurality of handheld units 8 that are independent from one another in the installation 1.

The handheld unit 8 may be provided with a geotag that can supply an instantaneous three-dimensional position in a three-dimensional reference frame to the central unit 6.

It should be understood that the instantaneous three-dimensional position of the handheld unit 8 and the instantaneous three-dimensional positions of the parcels can be determined periodically by the central unit 6, and that it is possible to associate a time stamp with each of the three-dimensional positions, in such a manner as to facilitate match detection.

Naturally, the present invention is in no way limited to the above description of one of its embodiments, which can undergo modifications without going beyond the ambit of the invention. The invention is also applicable to articles other than parcels.

The invention claimed is:

1. An installation for conveying handled parcels, said installation including a linear conveyor for conveying parcels in series, and a monitoring and control central unit that stores, in a memory, the instantaneous three-dimensional spatial location of each parcel moving on the conveyor, said installation being characterized in that it further includes at least one nomadic handheld electronic unit that is suitable for detecting information on a parcel when it is placed in the vicinity of said parcel, and for transmitting said information to the central unit, and in that the central unit is arranged to read an instantaneous three-dimensional spatial location for said nomadic handheld electronic unit in response to receiving said information coming from said nomadic handheld electronic unit, and in that said central unit is further arranged to detect a match between the instantaneous three-dimensional spatial location of a certain parcel on the conveyor and said instantaneous three-dimensional spatial location of the nomadic handheld electronic unit substantially at a time at which said information is transmitted to the central unit, and to respond to such a match being detected by recording said information in a memory in correspondence with data associated with said certain parcel.

2. An installation according to claim 1, characterized in that said handheld unit is a bar code reader.

3. An installation according to claim 1, characterized in that said handheld unit is a camera.

4. An installation according to claim 1, characterized in that said handheld unit is equipped with a geotag.

5. An installation according to claim 1, characterized in that the parcels are postal parcels.

6. A method for processing parcels comprising:

conveying said parcels in series on a linear conveyor under control of a monitoring and control central unit which store in memory the instantaneous three-dimensional spatial location of each parcel moving on said conveyor, moving a nomadic handheld electronic unit towards a parcel moving on said conveyor and detecting on the fly with said nomadic handheld electronic unit information on the parcel when said nomadic handheld electronic unit is placed in the vicinity of said parcel and transmitting said information to the central unit, transmitting to said central unit an instantaneous three-dimensional spatial location of said nomadic handheld electronic unit in response to said central unit receiving said information coming from said handheld unit, detecting with said central unit a match between the instantaneous three-dimensional spatial location of a certain parcel on the conveyor and said instantaneous three-dimensional spatial location of the nomadic handheld electronic unit substantially at a time at which said information is transmitted to the central unit, and in response to such a match, recording said information in memory of the central unit in correspondence with data associated with said certain parcel.

* * * * *